United States Patent

[11] 3,623,958

[72] Inventor James E. Fitzgerald
Anaheim, Calif.
[21] Appl. No. 808,914
[22] Filed Mar. 20, 1969
[45] Patented Nov. 30, 1971
[73] Assignee North American Rockwell Corporation
El Segundo, Calif.

[54] AUTOMATED STREAKING DEVICE FOR ISOLATING MICRO-ORGANISMS ON AN AGAR SURFACE
5 Claims, 2 Drawing Figs.

[52] U.S. Cl. ................................................. 195/103.5 R, 195/127
[51] Int. Cl. ..................................................... C12b 1/02
[50] Field of Search ......................................... 195/103.5, 139, 127

[56] References Cited
UNITED STATES PATENTS
2,685,861  8/1954  Webb ........................... 118/215
OTHER REFERENCES
Fisher Scientific Co. Catalogue. p. 371 (1962 Ed.)

Primary Examiner—A. Louis Monacell
Assistant Examiner—Mac D. Hensley
Attorneys—William R. Lane, Lee Humphries and Robert G. Rogers ABSTRACT: Micro-organisms are streaked on an agar surface by causing a ball, the surface of which contains micro-organisms, to rotate relative to the agar plate in a nonoverlapping pattern. As the ball rotates, the micro-organisms are deposited on the agar surface so that by the end of the rotation cycle, micro-organisms are deposited in isolated amounts.

PATENTED NOV30 1971 3,623,958

INVENTOR.
JAMES E. FITZGERALD
BY *Robert G Rogers*
ATTORNEY

AUTOMATED STREAKING DEVICE FOR ISOLATING MICRO-ORGANISMS ON AN AGAR SURFACE

BACKGROUND OF THE INVENTION

1. Field of the Invention

This invention relates to an automated streaking device for isolating micro-organisms on an agar surface and more particularly to such a device in which micro-organisms are deposited on the agar surface in isolated amounts by the relative displacement of an agar plate and a movable object on the plate. The surface of the movable object contains micro-organisms which are deposited on the agar surface during the relative displacement of the plate and the object.

2. Description of Prior Art

One of the many procedures which must be performed in microbiology are plate streaks for isolating microbiological colonies. Distinctly isolated colonies produced as a result of growth starting with a single cell are absolutely necessary for the observance of colony morphology and the performance of staining and other procedures necessary for determining the genus, and in many cases the species, strain, etc. of an unknown organism.

Examples of bacterial micro-organisms which are isolated from samples include *Staphlococcus aureus*, *Salmonella typhosa*, *Escherichia coli*, and *Neisseria gonorrhoeae*. Examples of fungus-type micro-organisms which are isolated from samples include *Candida albicans*, *Actinomyces bovis*, *Cryptococcus neoformans*, and *Blastomyces dermatitidis*. In an actual process, a liquid, for example isolation broths, blood, urine, etc. or solids, for example, feces, scrapings, etc. might be used to identify an unknown bacteria. Fungi requires the same type of isolation as bacteria but, unlike the bacteria, the fungi are generally not subjected to additional tests since colony characteristics and microscopic appearance alone are usually adequate for their identification.

Generally, two or three plates are streaked per sample of the test matter. The streaking process requires approximately 30 seconds per agar plate of a technologist time. The quality of the streak and therefore the degrees of isolation of the micro-organism, depends on the training received by the technologist and the care taken in performing the process.

Problems typically encountered during a streaking process include the use of an improperly cooled inoculating needle following flame sterilization. As a result, the organisms may be destroyed during the streaking process. In addition, contaminates may be introduced by the use of an improperly sterilized inoculating needle. There are also the problems caused by the lack of reproducibility of streaks from one technician to another and the difficulty a technician often encounters in streaking soft agars which are easily cut. An improperly made streak must be redone before further testing is possible. The detection of a faulty streak may require anywhere from 12 to 48 hours depending on the rate of growth of the organisms present in the sample.

Several different manual methods are presently used by technicians to isolate micro-organisms from a specimen. Although any method is acceptable if it results in the isolation of the micro-organisms being streaked it would be more preferred if a device were developed for automatically streaking the micro-organisms. A preferred device should be capable of isolating colonies of micro-organisms from samples containing both high and low numbers of organisms. Streaking should be reproducible and plate handling by technicians should be minimized. The device should also be compatible with existing manual methods and should be amenable to large scale automatic microbiological systems.

SUMMARY OF THE INVENTION

Briefly, the invention comprises a device for streaking micro-organisms on an agar surface by causing an object, the surface of which contains the micro-organisms, to be displaced relative to the agar plate in a nonoverlapping pattern. As the object is displaced, the micro-organisms are deposited on the agar surface so that by the end of the relative displacement cycle, the micro-organisms are deposited in isolated amounts.

Therefore, it is an object of this invention to provide an automated streaking device for isolating micro-organisms on an agar surface.

It is still another object of this invention to provide an improved streaking process which reduces the problems caused by manual streaking processes.

A further object of this invention is to provide an automated micro-organism streaking device which reproduces streaking patterns from one streaking operation to another.

A still further object of the invention is to provide an automated streaking device for isolating micro-organisms on soft agar surfaces without cutting into the surface.

A still further object of this invention is to provide an automated streaking device for isolating micro-organisms on an agar surface in which the organisms are deposited in isolated amounts on the agar surface by the relative movement of an object depositing the micro-organisms on the agar surface.

These and other objects of the invention will become more apparent when taken in connection with the description of drawings, a brief description of which follows:

DESCRIPTION OF PREFERRED EMBODIMENTS

Figure 1:
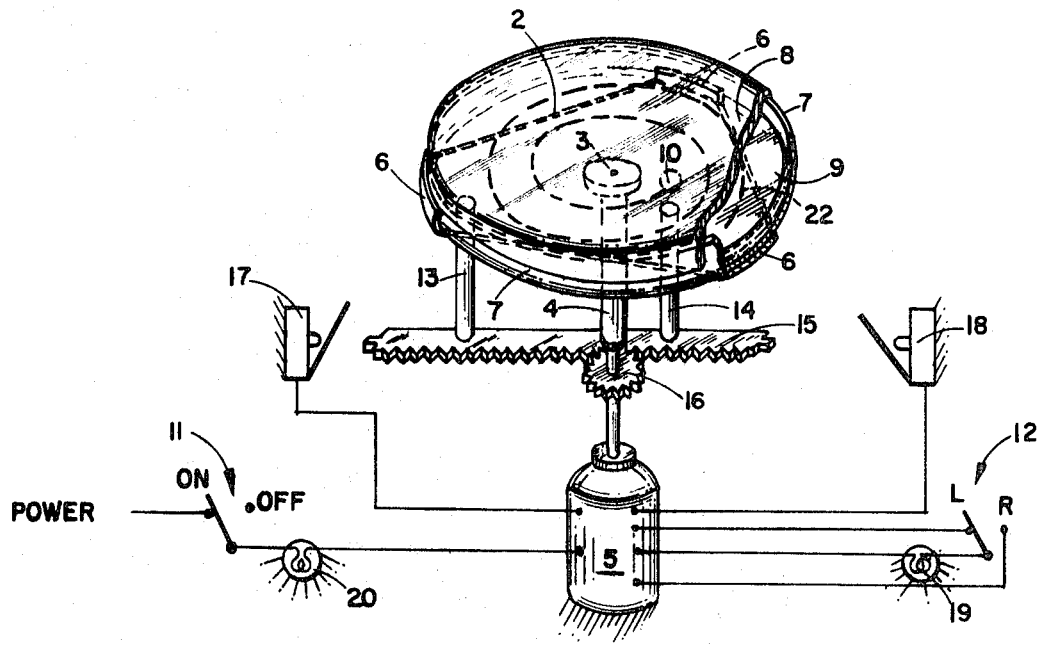
FIG. 1 is a partial schematic view of one embodiment of a device for streaking micro-organisms on an agar plate.

FIG. 1 is a partial schematic illustration of one embodiment of automated streaking device 1 comprising carrier plate 2 connected at its center 3 to shaft 4 of motor 5. The carrier plate 2 also includes three equally spread and raised edges 6 for holding agar plate 7 on the carrier plate during operation. In order to more clearly illustrate the details of the device 1, agar plate 7 including cover plate 8 and agar layer 9, is shown partially cut away on carrier plate 2. Metal ball 10 is shown disposed on the surface of the agar layer 9 for purposes to be described subsequently. An agar plate is ordinarily comprised of a clear plastic.

The carrier plate 2, may be molded from a relatively durable plastic in the triangular configuration shown and secured to the top of the shaft by a suitable adhesive or by molding a threaded receptacle at its center which mates with the threaded end of shaft 4. In other embodiments, different sizes, configurations, and materials may be used to implement a carrier plate.

Motor 5 may be any suitable AC or DC motor for rotating shaft 4. The motor is activated by closing the off-on switch 11 for causing the shaft 4 to rotate in either a clockwise or counterclockwise direction depending on the position of left-right switch 12. If the switch 12 is in the left position, the shaft rotates in a counterclockwise direction. If the switch 12 is in the right position, the shaft rotates in a clockwise direction. It should be obvious that for certain embodiments, a variable speed motor may be used. Similarly, although position switches are illustrated, pushbutton switches may also be used. For the latter embodiment, a switch would be held depressed once to initiate a test cycle.

The device further includes magnets 13 and 14 connected by ratchet gear 15 to circular gear 16 secured about the circumference of shaft 4. The magnets are disposed at the extremities of the ratchet gear and are spaced relative to each other so that when one of the magnets is in a position adjacent to shaft 4, the other magnet is at the extreme outer edge of carrier plate 2. One-quarter inch diameter magnets, commercially available, may be used for magnets 13 and 14.

By means of the ratchet gear 15 and circular gear 16, the magnets are caused to travel in a straight line under plate 2 in response to the rotation of shaft 4. When switch 12 is in the right position, shaft 4 rotates in a clockwise direction and the ratchet gear 15 is driven towards the right in a straight line. The converse is true when the switch is in the left position.

The device 1 also includes electrical switches 17 and 18 positioned at the opposite ends of the travel path of ratchet gear 15. The switches determine the stop positions for the magnets. In other words, when the end of ratchet gear 15 contacts one of the electrical switches, the switch closes and the motor stops. When that occurs, the motor can be turned on to rotate in the opposite direction by placing switch 12 in the opposite position. Lights 19 and 20 are included between switches 17 and 18 to indicate the operation of the system.

Details on the motor, including control switches for stopping the motor in response to contact by the ratchet gear, are believed known to persons skilled in the art. For that reason, additional details are omitted.

The distance between the top surfaces of the magnets and the bottom surface of the carrier plate 2 is such that the ball 10 is attracted by one of the magnets and attempts to follow the motion of the magnets as carrier plate 2 is rotated. A metal ball having a diameter of, for example 3/30 seconds to 5/30 seconds of an inch may be used. A standard sized agar plate, 3½ inches in diameter, may also be used for the particular embodiment shown.

The size of the magnet, or the diameter of the ball may have to be changed if the magnetic attraction is inadequate to maintain the attraction over the travel pattern of the ball or relative to the plate. In addition, the ball diameter and configuration must be determined as a function of the relative smoothness of the agar surface. In other words, when certain agar layers are produced, the surface includes minor imperfections such as pits, indentations, etc. The ball should have a diameter sufficiently large to roll over the imperfections without becoming lodged and without interfering with the path of the ball.

It is pointed out that although a steel ball is shown in the preferred embodiment, other configurations and materials are also possible. For example, a tubular shaped member comprised of a material which is attracted by the magnet could also be used. The only limitation is that the configuration and materials selected for a particular embodiment be able to follow the path of the magnet under it during the movement of the plate so that micro-organisms are deposited on the agar surface without disturbing the surface of the plate. For example, if a moving member were used which had sharp edges, the sharp edges could dig into the agar layer and thereby interfere with the deposition of the micro-organisms in a desired pattern. In addition, although a magnet is shown and described in connection with FIG. 1, in other embodiments other means could be used. For example, a streak of air could be directed on the ball during the rotation of the plate to produce a nonoverlapping pattern. Similarly, mechanical means could be used to rotate the ball on the plate with or without movement of the plate. In that case, the plate would remain stationary, and a ball having a shaft through its center would be rotated on the agar surface in a desired pattern.

It should also be pointed out that although the plate in FIG. 1 is shown as having a rotating motion and the magnets as having a straight line motion, by using various cam and/or gear combinations, the ball could be caused to assume other movement patterns. For the particular embodiment shown, as the magnets move in a straight line under the plate, while the plate is rotating, the ball follows a spiral path until it reaches the center of the plate. At that time, the end of ratchet gear 15 contacts a switch and the movement stops.

The agar plates are ordinarily packaged upside down so that the metal ball does not contact the surface of the agar layer prior to its use. When ready for use, the agar plate is turned right side up and manually tilted so that the ball is rolled to one edge of the plate which is then positioned so that the ball is disposed over the magnet at the edge of the carrier plate. However, the ball could be deposited on the plate just prior to a streaking operation.

In operation, a sample of the micro-organism is deposited on the ball or directly in front of the ball. A disposable capillary pipette may be used for liquid samples while any sterile object such as a wood stick, glass rod, etc. may be used for solid samples. Thereafter, the off-on switch 11 is turned on and the left-right switch 12 is turned to its opposite position. As a result, the carrier plate 2 begins to rotate and the magnets begin to move in a straight line under the carrier plate. The ball is displaced, or rotated, relative to the agar surface to deposit micro-organisms on the agar surface in a spiral pattern. The distance between each of the spirals is a function of the speed of the magnets and the rotational speed of the motor. The magnet speed can be changed by changing the ratio of ratchet gear 15 and circular gear 16. As the ball rotates, the micro-organisms are deposited in smaller amounts so that when the ball reaches the of its rotational cycle, micro-organisms are deposited in isolated quantities.

When the magnet reaches the end of its travel, the motor stops and the agar plate is removed from the carrier plate and inverted. Subsequently, it is placed in an incubation environment. During the next cycle, the ball is positioned at the opposite edge of the agar plate and the switch 12 is placed in the opposite position. Thereafter, the plate rotates and the magnets travel in a straight line in the reverse direction to produce micro-organisms in a spiral pattern on the agar surface.

Figure 2:
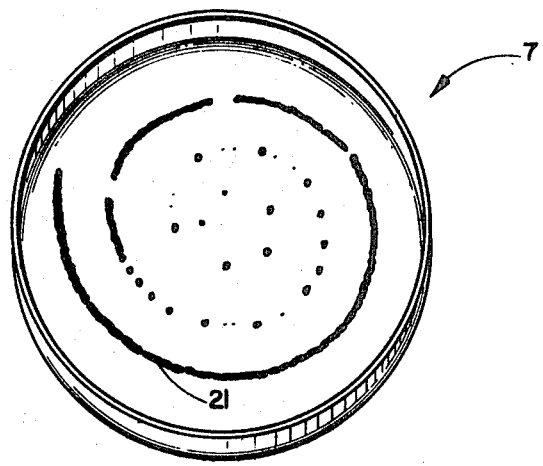
FIG. 2 is an illustration of an agar plate following a streaking operation and after incubation of the deposited micro-organisms.

Incubation may be done either aerobically with normal air, microaerophilically with a low concentration of air requiring a candle jar, or anaerobically with an absence of air, thereby requiring a special incubator, and is usually carried out at 22° C. (room temperature) or at 37° C. (body temperature). Incubation time may require from 18 hours to 4 weeks depending on the sample submitted for identification. After the agar plate has been allowed to incubate for the particular period involved, the growth of the micro-organisms appears substantially as shown in the pattern 21 in FIG. 2. The spiral pattern of the ball relative to the plate is partially shown by the dashed line 21 on the agar surface in FIG. 1.

After incubation, isolated colonies can be removed from the agar surface for further study as is well known to persons skilled in the art.

The following example is given by way of a specific illustration of the operation of the FIG. 1 device.

EXAMPLE

The particular process requires approximately 20 seconds. During the 20-second interval, the magnets traveled at a rate of 0.075 inch per second for a total distance of 1½ inches and the agar carrier plate rotated at the rate of one revolution per 6 seconds for a total of 3½ revolutions.

1. The motor switch was moved to the on position.
2. A standard agar plate with a metal ball which was aseptically placed on the agar surface by a technician was manually tilted to roll the ball to one circumferential edge of the plate. In other examples, the metal ball was prepackaged into the plate by the manufacture.
3. The agar plate was positioned on the carrier plate so that the ball was over the magnet at the extreme edge of the carrier plate.
4. A liquid sample was placed directly on top of the ball by a capillary pipette. In other examples, the sample was placed in the path of the ball.
5. The left-right switch was moved to its opposite position to activate the magnet and motor. The magnet was driven under the carrier plate in a straight line while the plate rotated so that the sample was distributed over the surface of the agar in a circular (spiral) pattern.
6. When the end of the ratchet gear contacted the opposite switch, the movement stopped. The agar plate was removed and inverted as is normally done for incubation. Following the incubation, isolated colonies were selected for additional processing.

Some of the physiological and biochemical tests include such routine tests as chromogenesis, gelatin liquefaction, starch hydrolysis, nitrate reduction, indol production, etc. Some of the differential and confirmatory tests are carbohydrate fermentations, urease production, salt tolerance, etc.

I claim:

1. An automated streaking device for isolating micro-organisms on an agar plate comprising,
   a magnetically responsive ball disposed on an agar plate,
   means for rotating the agar plate,
   magnet means for forcing the ball to roll on the surface of an agar plate in a nonoverlapping pattern simultaneously with the rotation of the agar plate whereby micro-organisms placed on said ball are deposited on the surface of an agar plate in decreasing amounts.

2. The combination recited in claim 1 wherein said means for rotating an agar plate comprises a rotating plate on which an agar plate has been disposed, and
   said magnet means disposed adjacent to said rotating plate for attracting said ball, and
   means for driving said magnet means simultaneously with the rotation of said rotating plate.

3. The combination recited in claim 2 wherein said ball comprises a metal ball,
   and said means for driving said magnet means includes means for driving the magnet means in a straight line under said rotating plate for driving said ball in a spiral pattern.

4. The combination recited in claim 3 including means for rotating said rotating plate in both directions,
   means for determining when the ball has reached the end of its spiral pattern,
   means for reversing the direction of rotation of said rotating plate,
   and a second magnet means connected for moving with the first magnet, means said second magnet means having a spacing relative to the first recited magnet means which always results in one magnet means being adjacent to one edge of said rotating plate at the end of a travel pattern.

5. A process for streaking micro-organisms on an agar plate to isolate micro-organisms on an agar plate, said process comprising the steps of,
   placing a magnetically responsive rolling object on the surface of an agar plate,
   rotating the agar plate,
   controlling the displacement of said rolling object on the surface of the agar plate in a nonoverlapping pattern by moving a magnet simultaneous with the rotation of the plate
   depositing micro-organisms on the rolling object or at least within the path of the rolling object so that the surface of the rolling object contacts said micro-organisms and thereafter deposits micro-organisms in decreasing amounts whereby near the end of said pattern the micro-organisms are isolated.

* * * * *